R. C. ROESCHEL.
CHEMICAL BANK AND VAULT PROTECTOR.
APPLICATION FILED MAY 4, 1920.
1,355,063.
Patented Oct. 5, 1920.
3 SHEETS—SHEET 1.
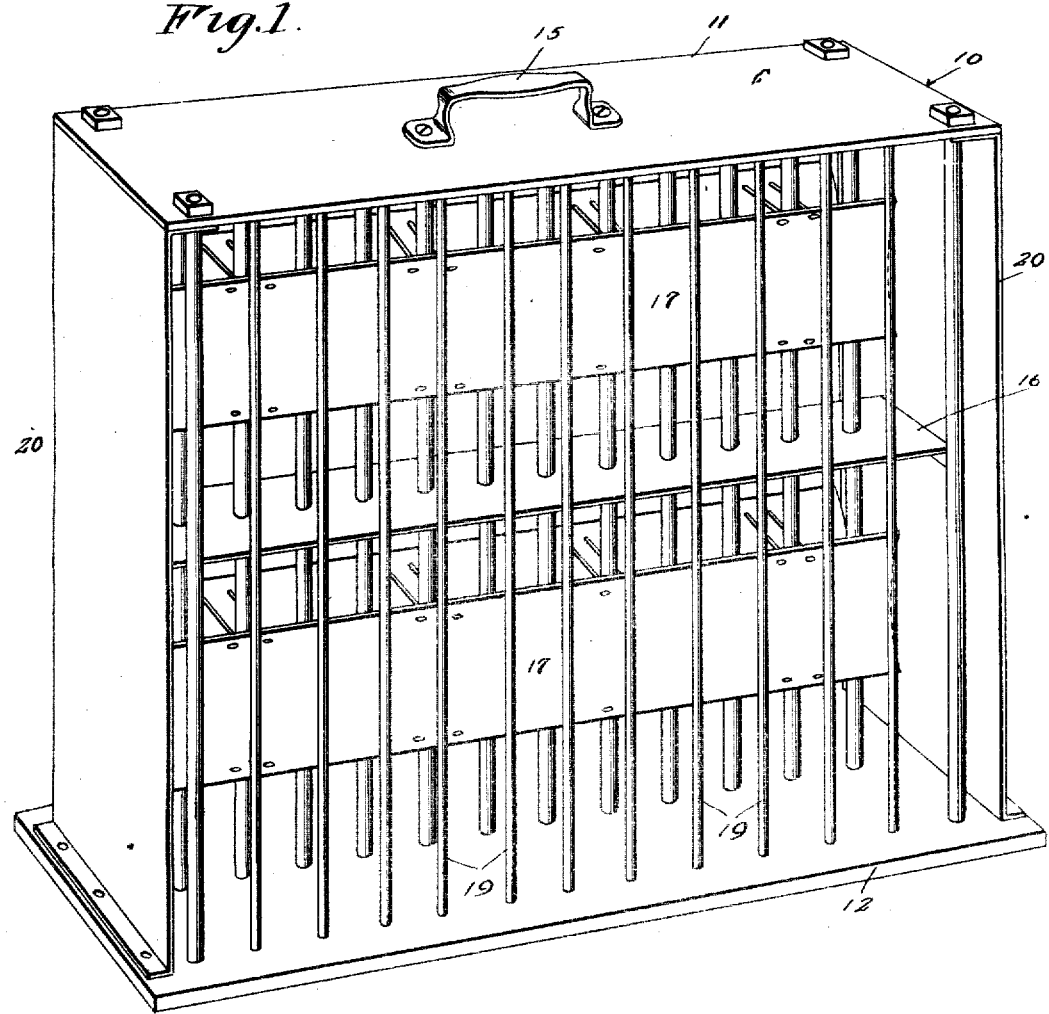
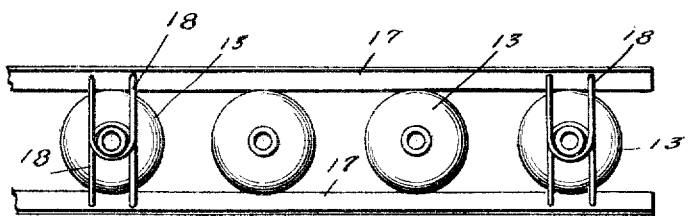
R. C. Roeschel INVENTOR
BY Victor J. Evans ATTORNEY R. C. ROESCHEL.
CHEMICAL BANK AND VAULT PROTECTOR.
APPLICATION FILED MAY 4, 1920.

1,355,063.

Patented Oct. 5, 1920.
3 SHEETS—SHEET 2.

R. C. Roeschel INVENTOR

BY Victor J. Evans ATTORNEY

WITNESSES

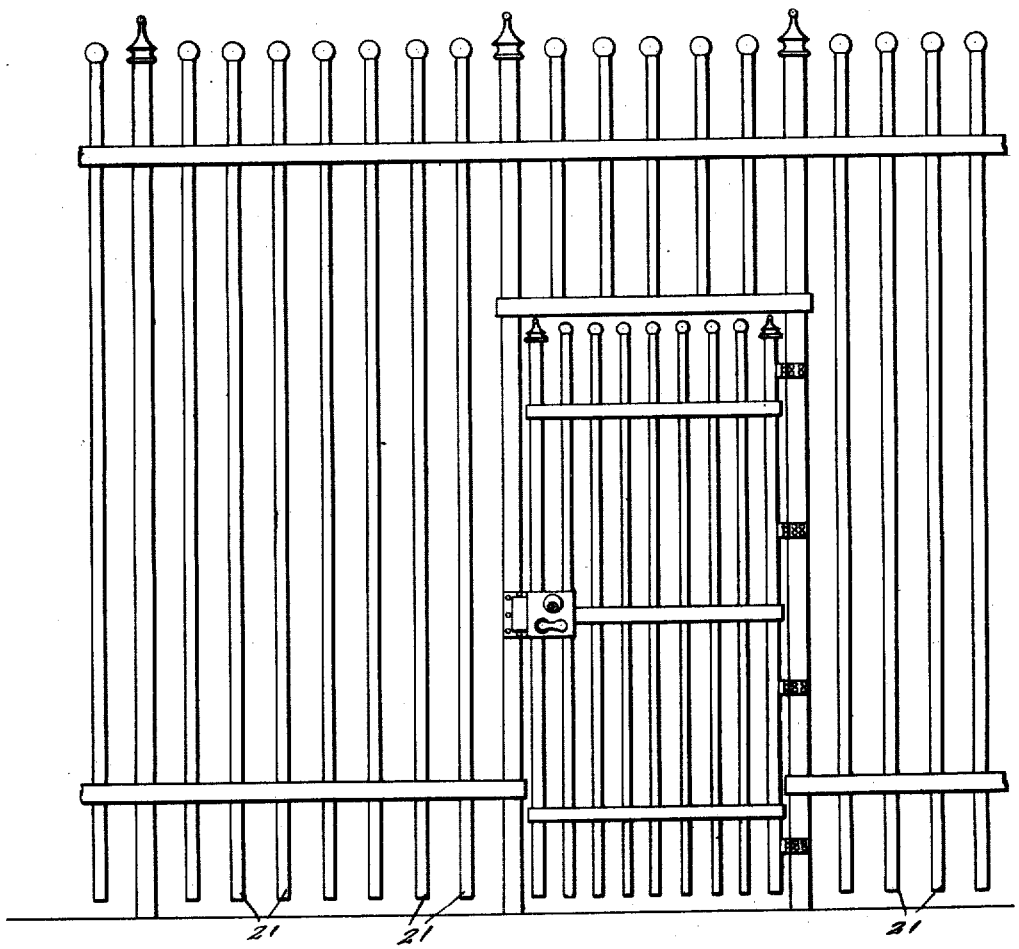

UNITED STATES PATENT OFFICE.

RICHARD C. ROESCHEL, OF HARRISBURG, PENNSYLVANIA.

CHEMICAL BANK AND VAULT PROTECTOR.

1,355,063.

Specification of Letters Patent.  Patented Oct. 5, 1920.

Application filed May 4, 1920. Serial No. 378,905.

*To all whom it may concern:*

Be it known that I, RICHARD C. ROESCHEL, a citizen of the United States of America, residing at Harrisburg in the county of Dauphin and State of Pennsylvania, have invented new and useful Improvements in Chemical Bank and Vault Protectors, of which the following is a specification.

The object of the invention is to provide a comparatively simple and effective means, distinguished from the mechanical and electrical means heretofore suggested for the protection of banking institutions and the like, for affording protection for banks, vaults and safes, buildings and other inclosures wherein valuables, securities money and so forth are deposited in a relatively unguarded position during certain hours and which in consequence are exposed to the depredations of skilful criminals who can readily acquaint themselves with the construction of mechanical and electrical protective devices and take the precaution to avoid discovery thereby, and who gain access to vaults and safes largely by the use of explosives, and with these objects in view the invention consists in a construction and combination of which a preferred embodiment is shown in the drawings wherein:

Figure 1 is a general perspective view of an apparatus suitable, subject to modification only in the manner of dimensions, for arrangement in vaults and safes in position to be affected by explosions employed for wrecking the lock and fastening means of the safe and vault doors.

Fig. 4 is a view of a section of a cage or vault guard and gate equipped with an equivalent but modified form of the apparatus.

Fig. 6 is a cross sectional view through one of the bars 21.

Fig. 7 is a view of the spacer member for holding the glass inner tube in the bar.

Fig. 8 is a plan view showing the tubes and the means for securing them to the concussion plates.

Figure 2:
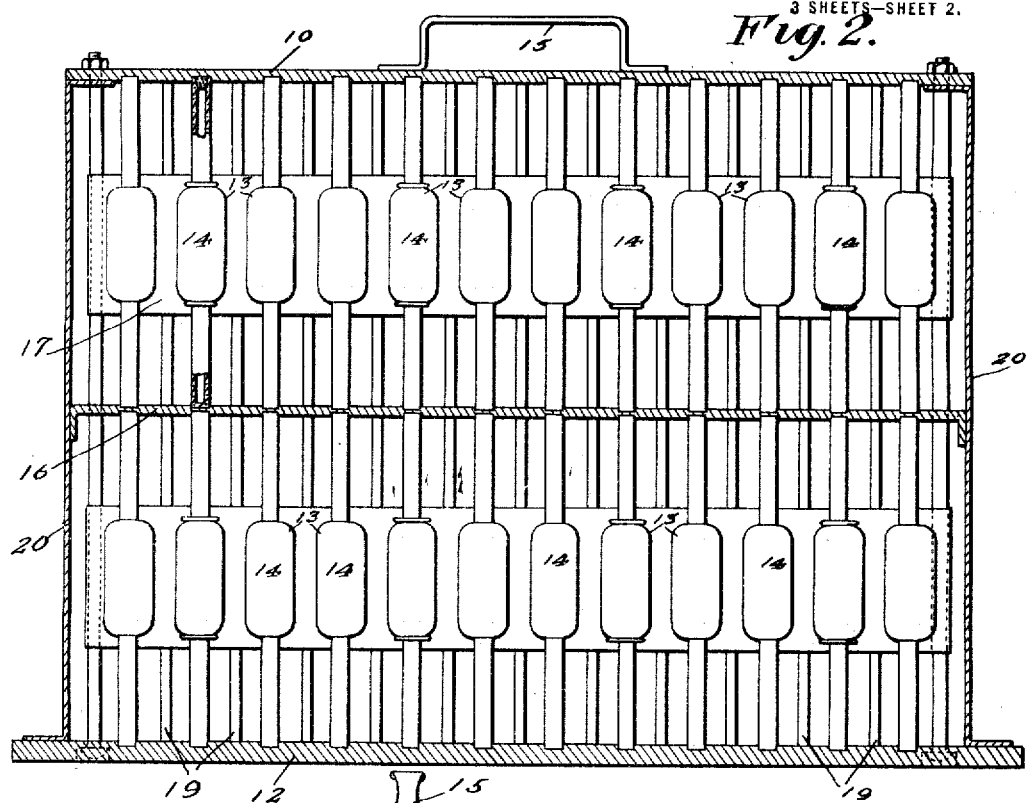
Fig. 2 is a longitudinal section of the same.
Figure 3:
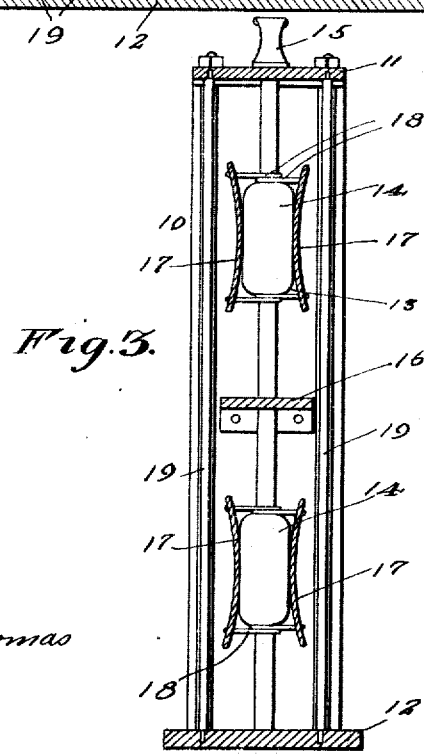
Fig. 3 is a transverse section.
Figure 5:
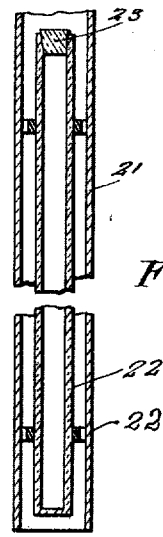
Fig. 5 is a detail enlarged section of one of the bars of the cage.

The invention consists essentially in exposing a frangible container provided with a charge of toxic gas, such as bromacetone, benzyl iodid, tear gases and the like, in such position or relation to the vaults, safes and other objects to be protected as to be inconspicuous or invisible to any one surreptitiously approaching the same for the purpose of gaining access thereto and readily subject to breakage or fracture in any effort or attempt made by such person to gain access to the inclosure, to the end that the gases or vapors may be liberated and thus either cause insensibility or induce precipitate flight from the neighborhood of the object which is being protected, and thus for arrangement within a vault or safe, in a position of relative proximity to the lock of the door by which the same is controlled, there is employed a portable case 10 shown in Figs. 1, 2 and 3 and having its spaced top and bottom walls 11 and 12 between which are arranged the vertically positioned tubes 13 of glass or equivalent material which is frangible and relatively fragile and is preferably of a dark color as green and is adapted to contain the selected toxic gas. The upper and lower extremities of these tubes which are preferably enlarged intermediately to form bulbs 14 as indicated, are seated in suitable sockets in the top and bottom walls of the case which may be conveniently transported from place to place by means of a suitable handle 15, intermediate portions of the tubes extending through a transverse partition wall or brace 16. Also located on either side of the plane of the series of tubes and preferably covering the large portions or bulbs 14 thereof, are concussion plates 17 preferably slightly concaved as indicated in Fig. 3 and connected with the reduced portions or necks of the tubes by eyes or staples 18, so that in the event of an explosion occurring in the vicinity of the apparatus the plates will receive the force of the concussion and tend to break the tubes to liberate the contents with the effect above indicated. The case is entirely open at its sides to give free access to the air so that the concussion plates may be directly affected by an explosion, and protection is afforded under normal conditions, to prevent contact with the plates with the intermediate portions of the tubes by means of rods 19 disposed substantially in the planes of the forward edges of the side walls 20. These protecting rods simply constitute an open guard to prevent fracture of the tubes in removing the case from place to place, it being obvious that the same should be located in the safe or vault when the latter is to be left for the night, but should be removed during the business hours of the bank to avoid the possibility of accidental liberation of the gases.

The same principle is carried out in the protection as applied to guard fences or screens, window gratings, doors and the like as indicated in Fig. 4, wherein the bars 21 of the screen and gate are hollow as shown in detail in Fig. 6 and contains a frangible tube 22, of glass or the like charged with the toxic gas and normally held from discharge by a suitable stopper 23. I provide spacer members 22' for spacing the tubes from the interior walls of the bars, these spacer members being formed as shown in Figs. 6 and 7. It will be obvious that either by explosion or by attempting to cut or bend or otherwise break or remove a bar, the contained receptacle will be fractured and the gas liberated.

What is claimed is:—

1. A device of the class described having a portable case, frangible tubes for containing toxic gas and having enlarged intermediate portions or bulbs, concussion plates arranged in spanning relation with said enlarged portions or bulbs of the tubes, and means for connecting said plates with reduced or neck portions of the tubes.

2. A device of the class described having a portable case open at its opposite sides and provided with guard rods and an intermediate series of frangible tubes containing toxic gas and having terminal and intermediate reduced portions and intermediate enlarged portions or bulbs, and concussion plates transversely bowed and arranged in spanning relation with the enlarged portions or bulbs of said tubes and having suspending means engaged with the reduced or neck portions of the same.

In testimony whereof I affix my signature.

RICHARD C. ROESCHEL.